(12) United States Patent
Chan et al.

(10) Patent No.: US 10,049,112 B2
(45) Date of Patent: Aug. 14, 2018

(54) SYSTEM AND METHOD FOR MONITORING OF DATABASE DATA

(71) Applicants: Pak Man Chan, Vancouver (CA); Walter Mak, Vancouver (CA)

(72) Inventors: Pak Man Chan, Vancouver (CA); Walter Mak, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 389 days.

(21) Appl. No.: 14/536,853

(22) Filed: Nov. 10, 2014

(65) Prior Publication Data

US 2016/0132511 A1    May 12, 2016

(51) Int. Cl.
*G06F 17/30* (2006.01)
(52) U.S. Cl.
CPC .. *G06F 17/30082* (2013.01); *G06F 17/30144* (2013.01)
(58) Field of Classification Search
CPC .................. G06F 17/30144; G06F 17/30082
See application file for complete search history.

(56) References Cited

U.S. PATENT DOCUMENTS

| | | | | |
|---|---|---|---|---|
| 2012/0197925 A1* | 8/2012 | Balagopalan | ..... | G06F 17/30501 707/769 |
| 2013/0054582 A1* | 2/2013 | Macklem | ......... | G06F 17/30648 707/723 |
| 2013/0297603 A1* | 11/2013 | Brenker | .............. | G06F 11/3006 707/737 |
| 2014/0195476 A1* | 7/2014 | Sxhmidt | .......... | G06F 17/30345 707/609 |
| 2015/0278314 A1* | 10/2015 | Fuglsang | .......... | G06F 17/30292 707/736 |
| 2015/0293969 A1* | 10/2015 | Aakolk | .................. | G06Q 10/00 707/802 |
| 2016/0063107 A1* | 3/2016 | Schukovets | ......... | G06F 17/3056 707/770 |

* cited by examiner

*Primary Examiner* — Mark D Featherstone
*Assistant Examiner* — Ranjit P Doraiswamy
(74) *Attorney, Agent, or Firm* — Fish & Richardson P.C.

(57) ABSTRACT

The present disclosure relates a computer-implemented method comprising obtaining, at a database application, a selection of one or more database metadata items from a user device, wherein each metadata item includes human-intelligible content and each metadata item identifying an associated database object contained in a database, identifying, based at least partially on the database objects associated with the selected one or more metadata items, one or more predefined database views of the database application, registering the identified one or more predefined database views, monitoring if the one or more predefined database views are updated after the registering operation and triggering pushing of an update notification to the user device in response to a monitored update of the one or more predefined database views.

18 Claims, 6 Drawing Sheets

SYSTEM AND METHOD FOR MONITORING OF DATABASE DATA

TECHNICAL FIELD

The present disclosure relates to methods and systems for database systems. In particular, the present disclosure relates to a method for monitoring database data on user devices (e.g., mobile devices).

BACKGROUND

Today database systems can play a crucial role in managing the data of an enterprise. Furthermore (and as a consequence), requesting data from the database system can require a certain level of technical skill. For example, it can be required to understand details of the structure of the database or a format of requests to the database. In other examples, graphical user interfaces for requesting data from a database system can be complex such that a certain level of training (and/or expertise) is required to use them. Many potential users of a database system might not have the above discussed technical skills. Thus, these users might encounter difficulties in effortlessly retrieving required data from a database system.

SUMMARY

In a first general aspect of the present disclosure a computer-implemented method comprises obtaining, at a database application, a selection of one or more database metadata items from a user device, wherein each metadata item includes human-intelligible content and each metadata item identifying an associated database object contained in a database, identifying, based at least partially on the database objects associated with the selected one or more metadata items, one or more predefined database views of the database application, registering the identified one or more predefined database views, monitoring if the one or more predefined database views are updated after the registering operation and triggering pushing of an update notification to the user device in response to a monitored update of the one or more predefined database views.

In a second aspect according to the first aspect, triggering pushing of an update notification to the user device includes sending status update information to a push notification server, wherein the status update information includes information regarding an update of the predefined database view.

In a third aspect according to the second aspect, the push notification server is a mobile device operating system push application server.

In a fourth aspect according to any one of the first to third aspects, the method further comprises providing the identified one or more predefined database views for consumption to the user device.

In a fifth aspect according to any one of the first to fourth aspects, the one or more database objects include one or more columns of one or more database tables.

In a sixth aspect according to any one of the preceding aspects, one or more of the operations of obtaining the selection of one or more database metadata items, identifying one or more predefined database views, registering the identified one or more predefined database views, monitoring if the one or more predefined database views are updated, and triggering pushing of an update notification to the user device are performed by an in-memory database application.

In a seventh aspect according to any one of the preceding aspects, the computer-implemented method of claim 1, wherein the user device is a mobile device.

In an eighth aspect according to any one of the preceding aspects, the one or more predefined database views include one or more of an attribute view, an analytic view, or a calculation view, wherein an attribute view references one or more data items in other tables of the database, wherein an analytic view defines on or more functions operable on data items in the database, and wherein a calculation view is operable to provide composites of other views.

In a ninth aspect according to any one of the preceding aspects, identifying one or more predefined database views of the database application comprises obtaining information identifying a popularity of the one or more database objects associated with the selected one or more database metadata items in previous user selection processes and identifying, based at least partially on the database objects associated with the selected one or more metadata items and the information identifying a popularity of the one or more database objects, the one or more predefined database views of the database application.

In a tenth aspect according to the ninth aspect, the popularity of the one or more database objects is determined at least partially based on a selection frequency in previous user selection processes.

In an eleventh aspect according to any one of the preceding aspects, identifying one or more predefined database views of the database application comprises obtaining user-specific information associated with the user of the user device and identifying, based at least partially on the database objects associated with the selected one or more metadata items and the user information, the one or more predefined database views of the database application.

In a twelfth aspect according to any one of the preceding aspects, identifying one or more predefined database views of the database application comprises obtaining usage information of the database objects associated with the selected one or more metadata items and identifying, based at least partially on the database objects associated with the selected one or more metadata items and the usage information of the database objects, the one or more predefined database views of the database application.

In a thirteenth aspect according to any one of the preceding aspects, monitoring if the one or more predefined database views are updated comprises one or more of monitoring a status of the predefined database views, monitoring if a measure or metadata calculated from a measure of the predefined database views changes and monitoring if an alert system of the predefined database view is triggered.

In a fourteenth aspect according to any one of the preceding aspects, the method further comprises providing a list of selectable database metadata items for presentation on the user device.

In a fifteenth aspect according to any one of the preceding aspects, the database metadata items include one or more of a identifier of the associated one or more database objects, a title of the associated one or more database objects, or a description of the associated one or more database objects.

In a sixteenth aspect according to any one of the preceding aspects, the method further comprising receiving, from the user device, a request to provide the one or more updated predefined database views to the user device.

In a second general aspect of the present disclosure a computer-implemented method comprises obtaining information identifying a popularity of the one or more database objects associated with the selected one or more database metadata item in previous user selection processes, identifying, based at least partially on the database objects associated with the selected one or more metadata items and the information identifying a popularity of the one or more database objects, one or more predefined database views of the database application and registering the identified one or more predefined database views for future provision of data related to the one or more predefined database views to a user device.

In a third general aspect of the present disclosure computer readable medium storing instructions thereon which when executed by a processor cause the processor to comprising the steps operations comprising the steps of any one of the first to sixteenth aspects.

In a fourth general aspect of the present disclosure a system comprises one or more processors and a computer-readable medium storing instructions executable by the one or more processors to perform operations comprising the steps of any one of the first to sixteenth aspects.

DETAILED DESCRIPTION

The present disclosure relates to methods and systems for database systems. In particular, the present disclosure relates to a method for monitoring database data on user devices (e.g., mobile devices).

The subject-matter described in this disclosure can be implemented in particular embodiments so as to realize one or more of the following advantages:

First, a non-expert user can consume database data from (potentially complex) database systems. No advanced level of expertise might be required to consume database data. In particular, the user might select database data for consumption based on human-intelligible pieces of metadata.

Second, a user can "follow" predetermined database data items. The user can receive an update notification as soon as the predetermined database data item is modified. In this manner, the user can keep track of certain database items of interest in an effortless manner.

Third, a set of potentially interesting database items can be selected based on a user input. The user does not have to know the underlying structure of the database. This again helps non-expert users to consume database data in an effortless manner.

Fourth, an update notification system can be seamlessly integrated in a mobile device environment. A mobile device push notification server can be used to push update notifications regarding database items followed by a user. This mechanism can be implemented in an unobtrusive manner on a mobile device.

Subsequently, an example database data monitoring system will be discussed in connection with FIG. 1. In connection with FIG. 2, several aspects of a mobile interface of a database data monitoring application will be discussed. Last, in connection with FIGS. 3 to 6 different aspects of a database data monitoring method will be described.

Figure 1:
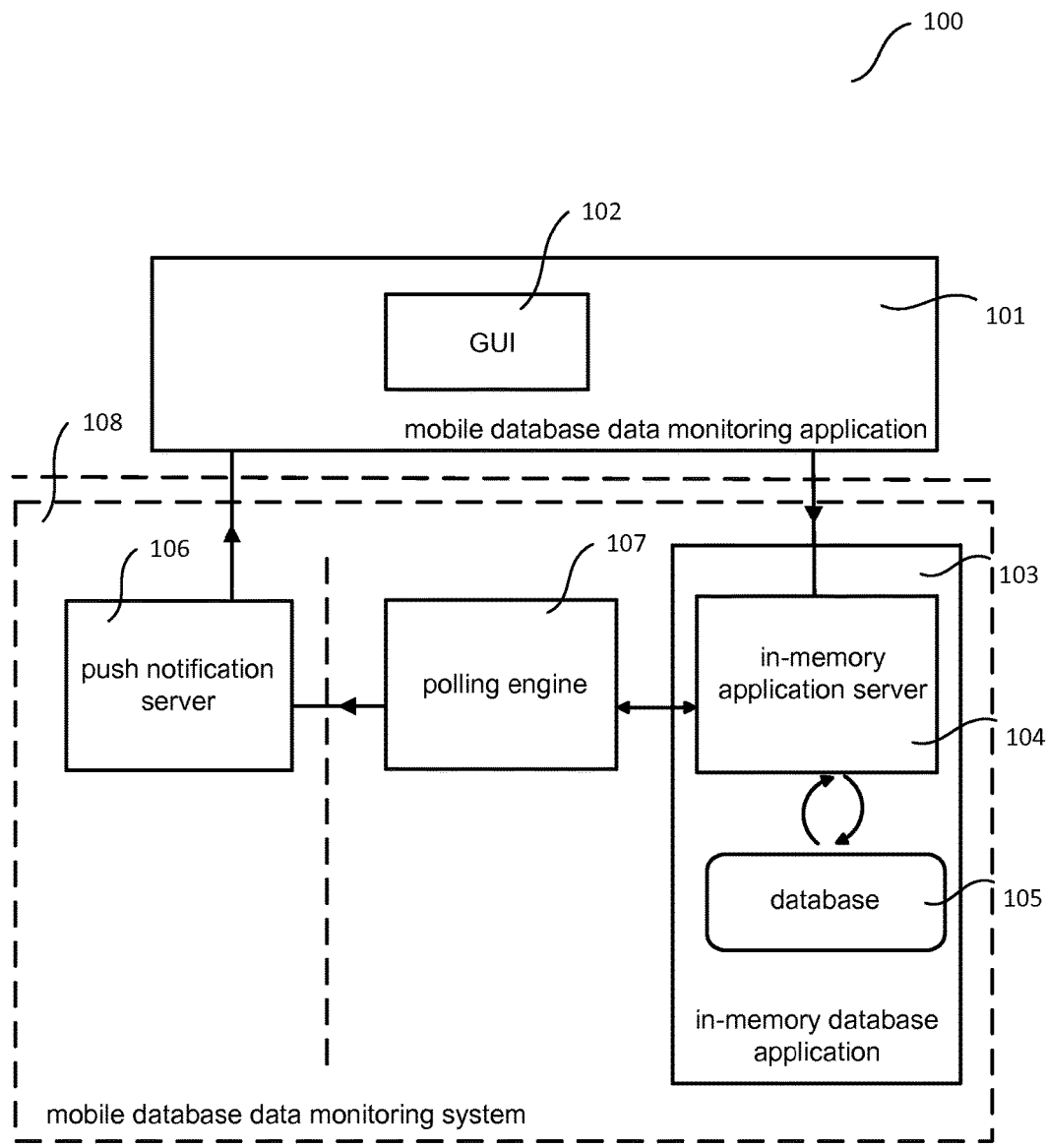
FIG. 1 illustrates a layout of an example database data monitoring system according to an implementation.

FIG. 1 depicts different components of a database data monitoring system 100. The example system of FIG. 1 includes an in-memory database application 103, a polling engine 107, a push notification server 106, and a mobile database data monitoring application 101. The operation and optional aspects of these components will be explained in more detail subsequently.

In the example of FIG. 1, the user can monitor database data by using a mobile database data monitoring application 101. However, the systems and methods of the present disclosure are not limited to mobile applications. In other examples, the user can monitor database data over a desktop device or any other computer device. Even though the systems and methods of the present disclosure can be particularly advantageous on mobile devices, some or all of the advantages described above can also be achieved in non-mobile implementations.

The mobile database data monitoring application 101 can include a graphical user interface 102. The graphical user interface 102 can present to a user one or more database metadata items. Each metadata item can include human-intelligible content and each metadata item can identify an associated database object contained in a database. In the present disclosure the term "human-intelligible" refers to a string of characters that can be read and understood by a human reader without translation/further processing. For example, the human-intelligible content can include one or more of a title of the associated database object, a description of the associated database object, or a human-intelligible identifier of the associated database object.

Moreover, the graphical user interface 102 can be configured to receive user input (e.g., a selection of a particular metadata item). The graphical user interface 102 can be further configured to present an update notification to a user of the mobile database data monitoring application 101. Further details of the graphical user interface 102 are described in connection with FIG. 2.

In the example of FIG. 1, the mobile database data monitoring application 101 communicates with two components of the mobile database data monitoring system 108. First, the mobile database data monitoring application 101 can communicate with an in-memory application server 104 of the in-memory database application 103. The in-memory database application 103 will be explained in more detail subsequently. However, in the systems and methods of the present disclosure, it is not required that the database is stored in-memory. The database data monitoring systems and methods of the present disclosures can also be employed to monitor data of persistent databases, or data of a hybrid database. In addition, the database data monitoring systems and methods of the present disclosures can be employed in different layouts of the database system. For instance, the database system can include one or more back-end server systems or can be a cloud-based database system.

The example in-memory database application 103 includes an in-memory database 105 and the in-memory application server 104. The in-memory application server 104 can provide an interface to retrieve data from the in-memory database 105. For instance, the in-memory application server 104 can communicate with the mobile database data monitoring application 101 by using a Hypertext Transfer Protocol (HTTP). In some implementations, the mobile database data monitoring application 101 can communicate with the in-memory application server 104 by using OData requests. The OData protocol supports a variety of database operations, and it is built on top of the Hypertext Transfer Protocol (HTTP). Thus, OData services can be consumed by a wide variety of platforms supporting HTTP. Database services are requested in the framework of the OData protocol by a uniform resource identifier. In general, the OData protocol defines a predetermined syntax for the uniform resource identifier. Likewise, the OData protocol defines how the returned data is to be formatted. In addition, the OData protocol specifies that one or more metadata objects corresponding to the returned data objects must be structured in a particular manner.

Apart from the communication with the mobile database data monitoring application 101, the in-memory application server 104 can interact with the data in the in-memory database 105. In one example, the in-memory application server 104 can read, write, update, and delete data in the in-memory database 105 based on received requests. This can include translating a request into a database query language (e.g., SQL or SQLscript). For example, a predetermined database object can be stored in the in-memory database 105. The predetermined database object can be associated with metadata, and in particular the predetermined database object can be associated with human-intelligible metadata. The in-memory application server 104 can provide this human-intelligible metadata to the mobile database data monitoring application 101 upon request or in a push operation. Details of these operations will be given in connection with FIG. 3 to FIG. 6 below.

Moreover, the in-memory application server 104 can be configured to identify, based at least partially on the database objects associated with one or more metadata items a user has selected, one or more predefined database views of the database application. The database data monitoring system can provide the user with update notifications regarding these predefined database views, as will be discussed in more detail below.

In the example of FIG. 1, the database data monitoring system 100 further includes the polling engine 107. The polling engine 107 can communicate with the in-memory application server 104 (e.g., by using HTTP-based protocols) discussed above. In the example of FIG. 1, the polling engine 107 can be configured to monitor if one or more database views identified based on a user selection of database metadata items have been updated. In addition, the polling engine 107 can be configured to communicate status update information to the push notification server 106 if the one or more database views have been updated.

The push notification server 106 can be a mobile device operating system push application server (e.g., a server hosting Apple's push notification service). In these examples, an operating system of the mobile device can be configured to support data being pushed from the push notification server 106 to a mobile device application. In the example of FIG. 1, an update notification in response to a monitored update of the one or more predefined database views can be pushed to the mobile database data monitoring application 101 by the push notification server 106. The pushing of the update notification can itself be triggered by the polling engine 107, as described above. The polling engine 101 can be configured to communicate with one or more additional push application servers (particularly, with one or more additional mobile device operating system push application server) in the manner described above. For instance, a first mobile device operating system push application server can be configured to operate with a first type of mobile device operating system and a second mobile device operating system push application server can be configured to operate with a second type of mobile device operating system. In this situation, the polling engine 107 (or any other component of the database data monitoring system 100) can be adapted to select a suitable second mobile device operating system push application server depending on the type of mobile device used by a user to monitor database data.

In the previous sections, the components of an example database data monitoring system have been discussed in connection with FIG. 1. In the following sections, further aspects of a mobile database data monitoring application will be explained in connection with FIG. 2.

Figure 2:
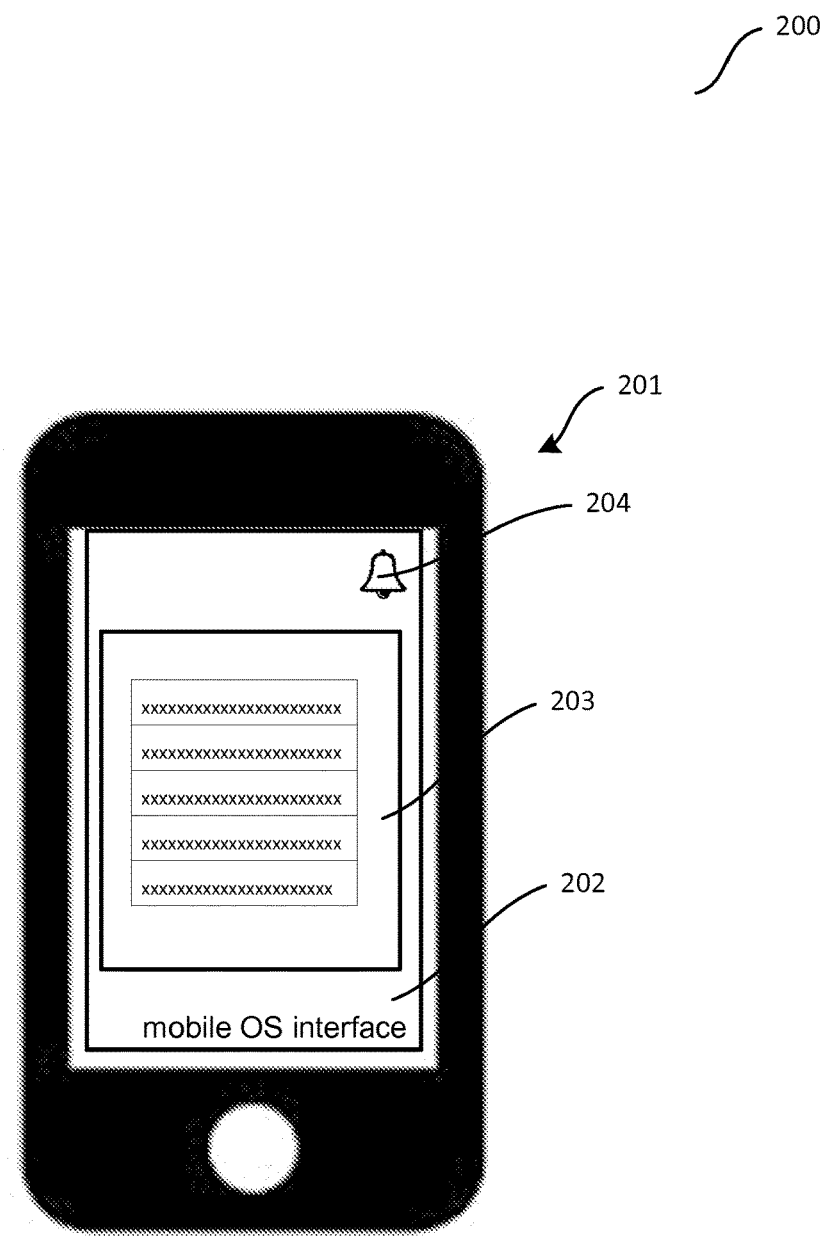
FIG. 2 illustrates a mobile device running a mobile database data monitoring application according to an implementation.
Figure 3:
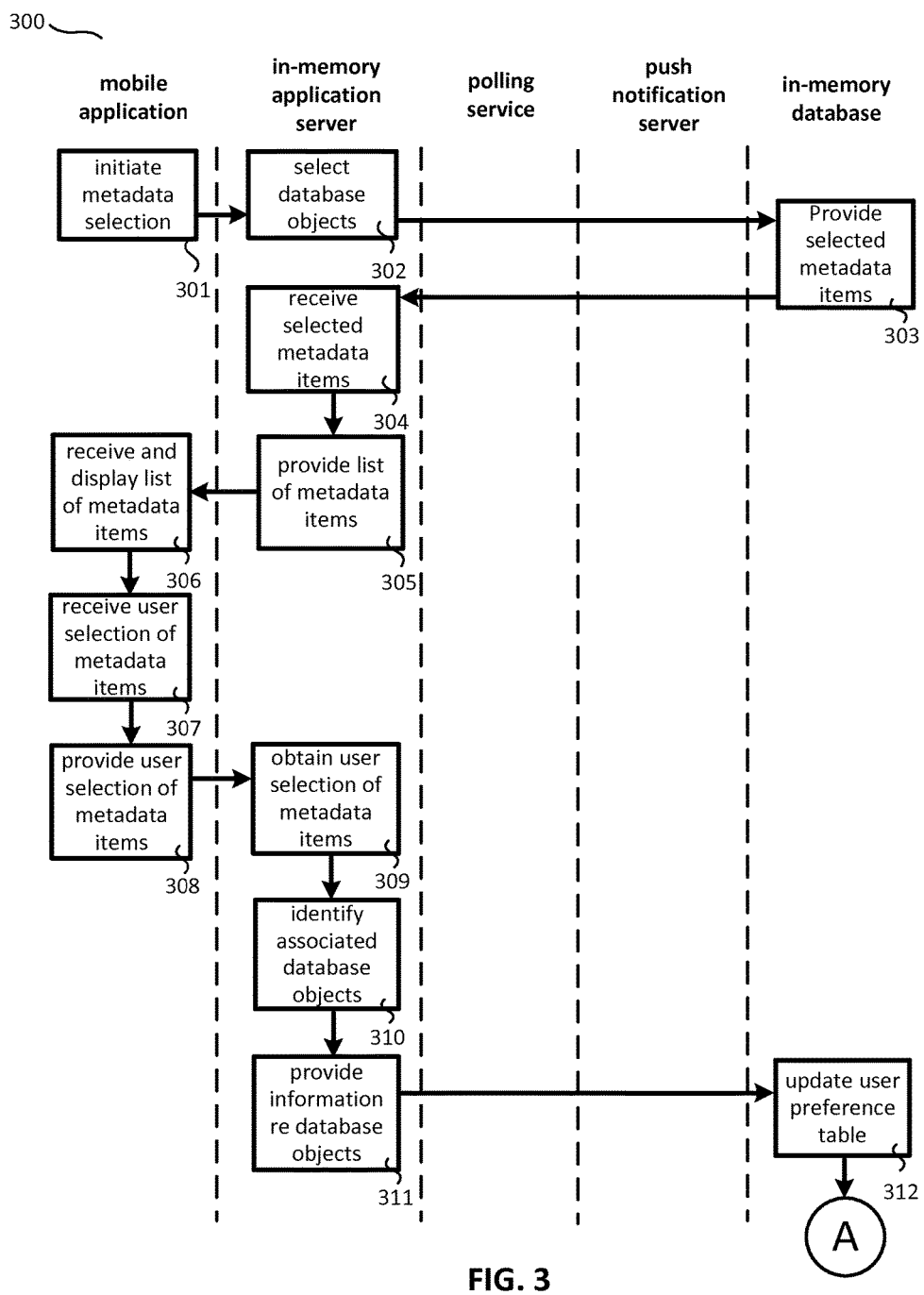
FIG. 3 illustrates a first group of operations of a database data monitoring method according to an implementation.

FIG. 2 shows an example mobile device 201 which can host a mobile database data monitoring application (e.g., mobile database data monitoring application 101 as described in connection with FIG. 1). The mobile device 201 can run a particular mobile device operating system. FIG. 2 schematically shows a graphical user interface 202 of a mobile device operating system. Different applications can be stored on the mobile device 202, including a mobile database data monitoring application of the present disclosure.

As can be seen in FIG. 2, the graphical user interface 202 of a mobile device operating system can provide for a visual indicator 204 that an update notification has been received. The bell-shaped visual indicator 204 of FIG. 2 is only one illustrative example of visual indicator. The size, the shape and the location of the visual indicator 204 is variable. In addition or alternatively, an audible indicator (e.g., a predetermined tone produced by the mobile device 201) or a tactile indicator (e.g., a vibration of the mobile device) can indicate that an update notification has been received. In this manner, a user can receive a simple and non-obtrusive update notification. As depicted in the example of FIG. 2, the interaction with further mobile application 203 (e.g., a messenger application) can be substantially undisturbed by the display of the visual indicator 204 of the mobile database data monitoring application.

In connection with FIG. 1 and FIG. 2 a mobile database data monitoring application has been discussed. However, the systems and methods of the present disclosure are not restricted to mobile application (programs). The techniques described in the present disclosure can also be implemented in other environments. For instance, in one example, the database data monitoring system can include a (thin) client on a user device. For example, the database data monitoring system can be accessed from the user device by using a web browser. In these examples, the update notifications can be displayed on a web page of the database data monitoring system.

An example database data monitoring method will be discussed subsequently in connection with FIGS. 3 to 6 (showing a combined swim-lane diagram).

In one operation 301, a user initiates a database metadata selection process. This can include starting or activating a respective application on the mobile device (or any other suitable user device). The user might decide that he or she wants to monitor the changes in a particular dataset stored in the database. In some cases, the user might be unaware of the underlying structure of the data in the database (e.g., which database view have been defined in the database). In one illustrative example, the user might be a manager who is interested in a development of the sales numbers in a particular country.

In a further operation 302, the in-memory application server selects one or more database objects (e.g., database columns) that might be of interest for a particular user. For instance, a subset of database objects (e.g., database columns) can be identified as interesting based on identifying the mobile device, the user of the mobile device, or both. In other examples the user device can have provided the in-memory application server with a pre-selection of potentially interesting database objects. The in-memory application server requests database metadata items associated with the one or more database objects from the in-memory database. In further operations 303, 304, the in-memory database provides the database metadata items to the in-memory application server. The in-memory application server provides, in a further operation 305, the database metadata items to the mobile application. At 306, the mobile application receives and displays the list of database metadata items. For example, the metadata items can be short descriptions of the content of associated database columns.

In further operations 307, 308, 309, the mobile application receive a user selection of one or more database metadata items and returns the user-selected one or more metadata items to the in-memory database application server. In the example above, the manager might select one or more metadata items having the term "sales" in its human-intelligible content.

In a further operation 310, the in-memory database application server identifies database objects associated with the user-selected one or more metadata items. In some example, the database objects can include one or more of a database table, a database column, or a database row. As already described the database tables, database columns or database rows can be associated with human-intelligible metadata items. For instance, a metadata item associated with a database table or a database column can be a title or a short description of its content. In the example above, the columns associated with selected metadata items can include a column including all individual sales, a column including a region associated with each sale and a column including an amount of revenue generated with each individual sale.

In operations 311, 312, the in-memory database application server can provide information regarding the identified database objects (e.g., the database columns) associated with the user-selected one or more metadata items to the database. At the database, the information regarding the identified database objects can be stored in a user preference table. This user preference table can include information regarding a frequency with which a particular database object (e.g., a database column) has been selected by a user in a predefined period of time. In one example, the preference table includes a history and a frequency of the selection per user. For instance, the preference table can include a column for the user, a column of item keys, and a column of frequency.

Figure 4:
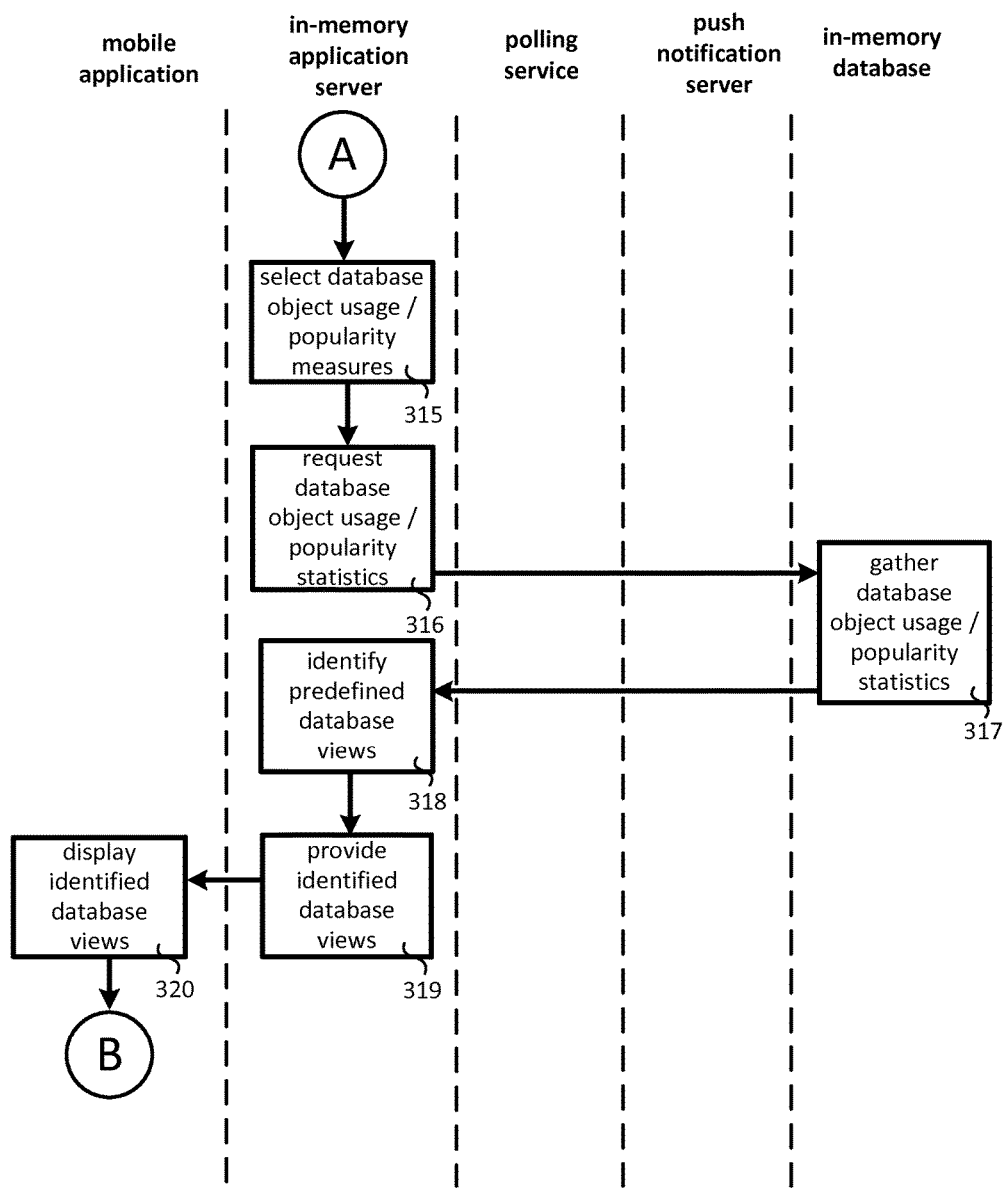
FIG. 4 illustrates a second group of operations of a database data monitoring method according to an implementation.

FIG. 4 illustrates a second group of example operations of a database data monitoring method. In operation 315, a particular database object usage or popularity measure is selected to identify one or more database views a user might be interested in. In other examples, however, the one or more database views a user might be interested in can be selected based solely on the identified database objects associated with the user-selected metadata items.

The database object usage or popularity measure can be fixed or variable. In one example, a database object usage or popularity measure can indicate how often a database object has been accessed in a predetermined period of time. In other examples, a database object usage or popularity measure can indicate how often a database object has been selected in previous runs of the database data monitoring method (i.e., how many users are "following" particular database object). In still other examples, a database object usage or popularity measure can take into account user-specific information regarding the current user. For example, a user can belong to a particular group of users or to a particular organizational unit of a company. This information can be used to select database objects the particular user might want to follow. In still other examples, a browsing history or a history of interactions with the database can be taken into account. In a further operation 316, database object usage/popularity statistics can be requested. In one example, the required database object usage/popularity statistics can be gathered 317 in the database. In other examples, user information can be retrieved from the user device (not shown in FIG. 4).

In a further operation 318, the in-memory application server identifies one or more predefined database views of the database based, at least partially, on the database objects associated with the selected one or more metadata items and the current database object usage/popularity statistics. In some examples, the one or more predefined database views include one or more of an attribute view, an analytic view, or a calculation view, where an attribute view references one or more data items in other tables of the database, where an analytic view defines on or more functions operable on data items in the database, and where a calculation view is operable to provide composites of other views.

The identification of the database views might include calculating a combined score which combines a number of the selected database objects included in a particular view and a database object usage/popularity score. In other examples, the identification of the database views might only be based on the selected database objects alone. For instance, a database view including the highest number of columns associated with the user selected metadata items can be identified.

In the following section, a particular example operation to select one or more database views will be presented. A first matrix can indicate which of the predefined database views of the database include which of the columns associated with the user-selected metadata items. An example matrix for four different database views and seven different database columns is depicted below. Thus, the user-selected metadata items are associated with seven columns, which are in turn included in four database views.

TABLE 1

|        | Column 1 | Column 2 | Column 3 | Column 4 | Column 5 | Column 6 | Column 7 |
|--------|----------|----------|----------|----------|----------|----------|----------|
| View 1 | 1 | 1 | 1 | 1 | 1 | 0 | 1 |
| View 2 | 0 | 1 | 1 | 0 | 1 | 0 | 0 |
| View 3 | 1 | 1 | 1 | 1 | 1 | 0 | 0 |
| View 4 | 0 | 0 | 1 | 0 | 1 | 1 | 0 |

In table 1 above, a "1" indicates that the respective column is included in a respective database view (i.e., its data is used in the database view directly or in a processed manner). A "0" indicates that a respective column is not included in a respective database view. For instance, the column 3 is included in all four database views, whereas the column 6 is only included in the fourth database view. For example, view 2 can be, in one example, an analytic view for determining a probability that salespersons reach their annual goal. This analytic view can use data from column including sales data, column 3 which can include a personal yearly goal for each salesperson and column 5 which can include a personal data of the salespersons. Thus, columns 2, 3 and 5 can be "included" in database view 2.

The database view a user might want to follow are selected based on the associated user selected columns. In one example, the database views could be selected based on a highest number of selected columns included in the respective database views. In this example, database views 1 and 3 would be selected as they include five of the columns associated with the user-selected metadata items. In other examples, database object usage/popularity statistics can be also used in the selection process. For instance, a vector can include a number of users having selected a particular column in previous user selection processes (this data can also be stored in any other suitable format).

TABLE 2

|  | Column 1 | Column 2 | Column 3 | Column 4 | Column 5 | Column 6 | Column 7 |
|---|---|---|---|---|---|---|---|
| # of previous users | 5 | 1 | 0 | 2 | 3 | 1 | 0 |

As can be seen in table 2, the first column has been selected by five users previously. In a further operation, a combined score can be determined for each database view. In one example, this can include a multiplying the matrix of table 1 and the vector of table 2, as shown below.

$$\begin{bmatrix} 1 & 0 & 1 & 1 & 1 & 0 & 1 \\ 0 & 1 & 1 & 0 & 1 & 0 & 0 \\ 1 & 1 & 1 & 1 & 1 & 0 & 0 \\ 0 & 0 & 1 & 0 & 1 & 1 & 0 \end{bmatrix} \cdot \begin{bmatrix} 5 \\ 1 \\ 0 \\ 2 \\ 3 \\ 1 \\ 0 \end{bmatrix} = \begin{bmatrix} 10 \\ 4 \\ 11 \\ 4 \end{bmatrix}$$

Equation 1

The vector on the right hand side of equation one includes one combined score for each database view. As can be seen, database view 1 has the highest score of 11. Thus, database view 1 can be identified as candidate for the user to be monitored. In other examples, more than one database view can be identified as candidate for the user to be monitored. For example, two or more database views having a highest combined score can be identified as candidate for the user to be monitored.

Turning back to FIG. 4, in further operations 319, 320, the identified one or more database views can be provided to the mobile application for presentation to the user. At operation 321, the user can accept the identified database view. In other examples, a user is registered to "follow" the identified database views automatically (i.e., the user does not have to accept the identified database views). In these examples, the user might ne not presented with the identified one or more database views. In the example above, the database might indeed include a database view including the sales data the manager is interested in. Thus, he might accept the selected database view. By selecting a particular database view, the user decides to "follow" the particular database view. In subsequent operations, the user can be notified if the data of the database view is updated or changes. This will be discussed in more detail below.

In one operation 324, the identified (and possibly accepted) database views are registered for a particular user by the in-memory application server. The registered database views are provided to the polling engine in operation 324. Subsequently, the polling engine triggers (in operation 326) a check for updates in the data of the identified data views. The polling engine can trigger an update check regularly (for example periodically), or event based. For example, the polling engine can trigger an update check once every predetermined period of time. In this manner, the polling engine participates in monitoring if the one or more predefined database views are updated after the registering operation.

Figure 5:
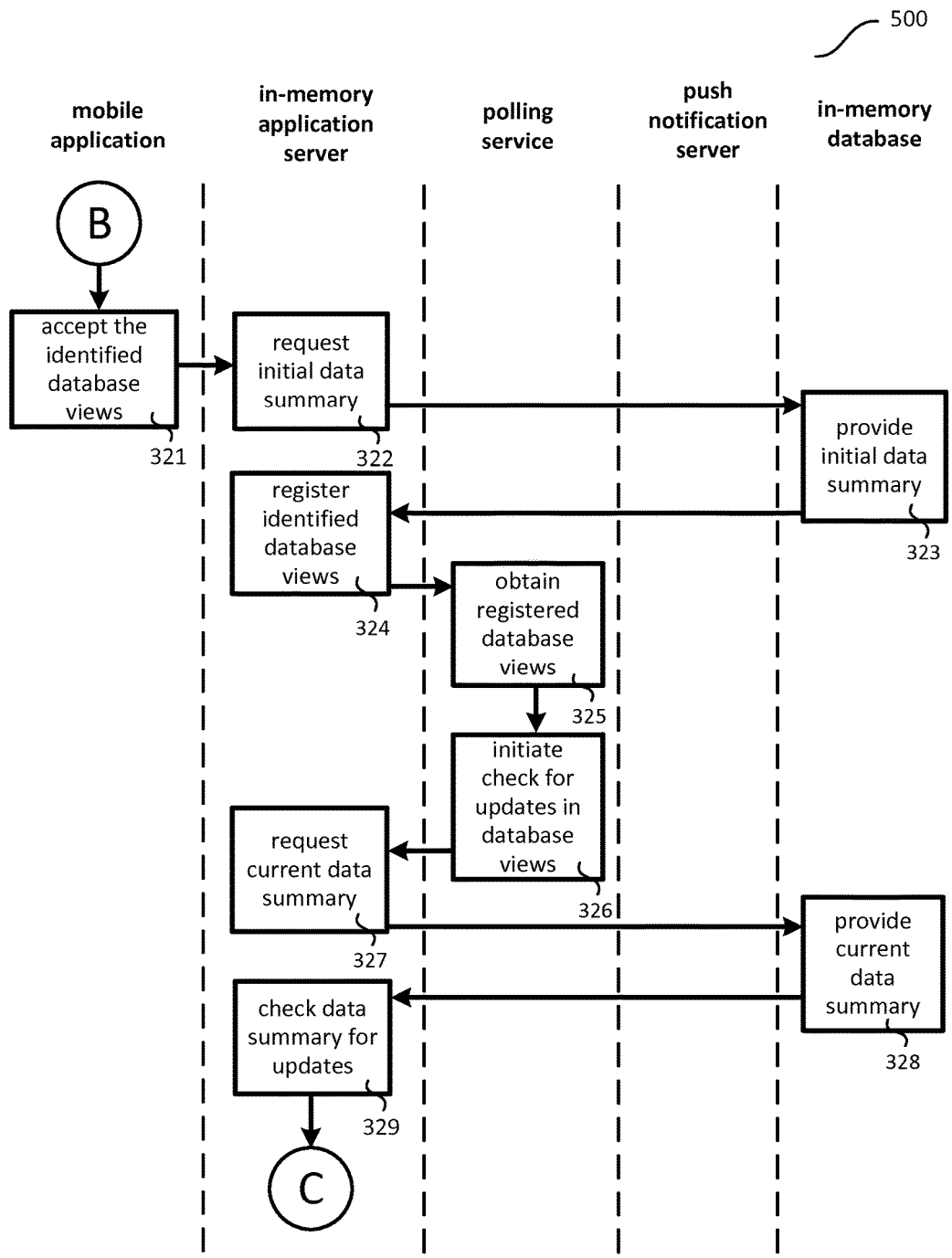
FIG. 5 illustrates a third group of operations of a database data monitoring method according to an implementation.
Figure 6:
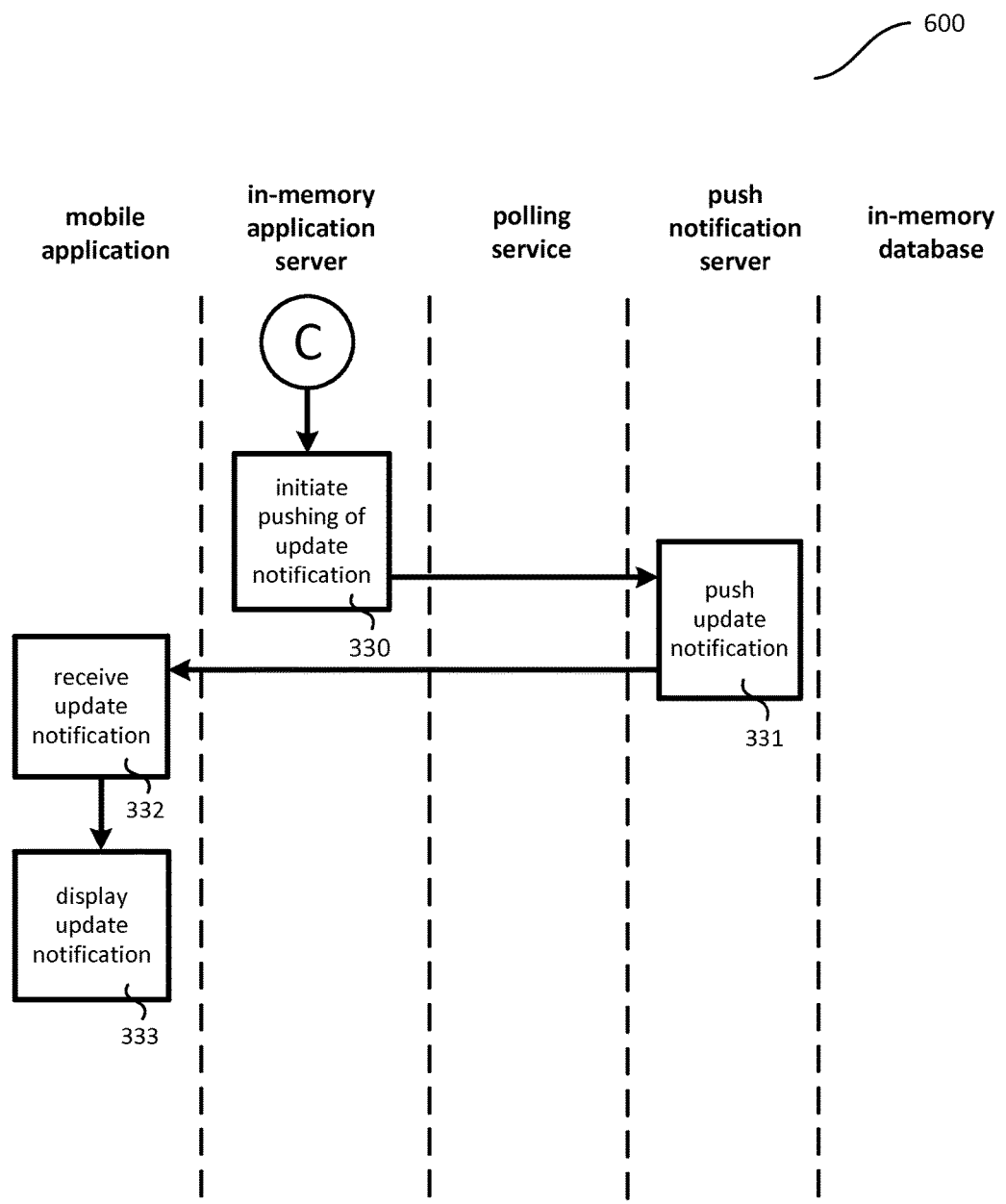
FIG. 6 illustrates a fourth group of operations of a database data monitoring method according to an implementation.

In the example of FIG. 5, the checking operation includes the following operations: The polling engine initiates requesting a current data summary of the identified database views by the in-memory application server in operation 327. In a further operation, the in-memory application server checks if the current data summary has been updated. This can include a comparison to a previously obtained data summary of the identified database views. The data summary can include a measure calculated in the predefined database views (e.g., an aggregate operation, an average operation, a count operation, a minimum operation, a maximum operation or a select operation). For instance, the summary can include an aggregate measure being a number of sales in a particular time period.

Additionally or alternatively, the checking operation can include other operations. For example, monitoring if the one or more predefined database views are updated can comprise one or more of monitoring a status of the predefined database views, monitoring if a measure or metadata calculated from a measure of the predefined database views changes and monitoring if an alert system of the predefined database view is triggered. In other examples, monitoring if the one or more predefined database views are updated can comprise checking if predetermined data items (or any data item) in the database objects associated with the identified database views have been changed. The monitoring and checking operations can be carried out by the in-memory application server triggered by the polling engine. However, in other examples, another component can trigger the monitoring operation. For example, a component of the in-memory database application server or another component of the database system can trigger the monitoring operation.

If the in-memory database application determines that the data of an identified database view has been updated, the in-memory database application initiates pushing 330 an update notification to the mobile application. This can include sending update information to the push notification server. The push notification server can in turn push 331 an update notification to the mobile application. In further operations 332, 333, the push notification is received by the mobile application and a respective indicator can be displayed.

In the previous sections, the components of the database data monitoring system have been described as functional units. These functional units can be embodied in different hardware and software environments, as will be discussed in the subsequent sections.

At a high level, the database data monitoring system is associated with a computer or processor. A computer or processor comprises an electronic computing unit (e.g., a processor) operable to receive, transmit, process, store, or manage data and information associated with an operating environment of the database system. As used in the present disclosure, the term "computer" or "processor" is intended to encompass any suitable processing device. The term "processor" is to be understood as being a single processor that is configured to perform operations as defined by one or more aspects described in this disclosure, or the "processor" comprises two or more processors, that are configured to perform the same operations (e.g., in a manner that the operations are distributed among the two or more processors). The processor may comprise multiple organic field-effect transistors or thin film transistors or a combination thereof. This may allow processing the operations in parallel by the two or more processors. The two or more processors may be arranged within a supercomputer, the supercomputer may comprise multiple cores allowing for parallel processing of the operations. For instance, a computer or processor may be a desktop or a laptop computer, a cellular phone, a smartphone, a personal digital assistant, a tablet computer, an e-book reader or a mobile player of media. Furthermore, the operating environment of the database system can be implemented using any number of servers, as well as computers other than servers, including a server pool. Indeed, the computer or processor and the server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the computer, processor and server may be adapted to execute any operating system, including Linux, UNIX, Windows, Mac OS, iOS, Android or any other suitable operating system.

The term "computing device," "server," or "processor" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a CUDA (Compute Unified Device Architecture) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and operating environment can realize various different computing model infrastructures. In enterprise systems, there are OLTP (OnLine Transaction processing) systems used to carry out business processes of a company where employees and other stakeholders, such as suppliers or customers, follow a business process which may result in business documents created in a database of the OLTP system. The database system can include in-memory databases in addition to the persistent databases described in connection with FIG. 1 and thereby exploit recent innovations in hardware to run a database in main memory. In an implementation of the present disclosure described herein, the servers may be types of a Java development platform, such as e.g., Enterprise JavaBeans® (EJB), J2EE Connector Architecture (JCA), Java Messaging Service (JMS), Java Naming and Directory Interface (JNDI), and Java Database Connectivity (JDBC), a ByDesign platform, SuccessFactors Platform, ERP Suite technology or in-memory database such as High Performance Analytic Appliance (HANA) platform. In an aspect, the servers may be based on two different of the above mentioned platforms.

Regardless of the particular implementation, "software" or "operations" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Python and R, Perl, any suitable version of 4GL, as well as others.

The figures and accompanying description illustrate example processes and computer-implementable techniques. However, the database system operating environment (or its software or hardware components) contemplates using, implementing, or executing any suitable technique for performing these and other processes. It will be understood that these processes are for illustration purposes only and that the described or similar techniques may be performed at any appropriate time, including concurrently, individually, or in combination. In addition, many of the operations in these processes may take place simultaneously, concurrently, and/or in different orders or combinations than shown. Moreover, operating environment may use processes with additional operations, fewer operations, and/or different operations, so long as the methods remain appropriate.

Aspects of the subject-matter and the operations described in this specification can be implemented in digital electronic circuitry, semiconductor circuits, analog circuits, or in computer software, firmware, or hardware, including the structures disclosed in this specification and their structural equivalents, or in combinations of one or more of them. Embodiments of the subject-matter described in this specification can be implemented as one or more computer programs, i.e., one or more modules of computer program instructions, encoded on computer storage medium for execution by, or to control the operation of a data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

A computer program (also known as a program, software, software application, script, or code) or "user interface" can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) "icons," some or all associated with a web browser, such as interactive fields, pull-down lists, and buttons operable by the user of the computing device hosting the UI. These and other UI icons may be related to or represent the functions of the web browser. The term "browser user interface" refers to a graphical user interface embedded in a web browser environment on the remote computing device. The browser user interface may be configured to initiate a request for a uniform resource locator (URL) and may be configured to display a retrieved web page such as an HTML coded web page. The browser user interface may comprise displayed or hidden icons which, upon activation, initiate an associated electronic process inside or outside the remote computing device. For example, the browser user interface may be Internet Explorer, Chrome or Firefox. "Creating an icon" is to be understood as generating a new icon on the user interface. "Modifying an icon" is to be understood as changing a property of an existing icon on the user interface. "Deleting an icon" is to be understood as vanishing an existing icon on the user interface, e.g., for replacement by a newly created icon. "Updating the user interface" thereby is to be understood as creating, modifying, or deleting an icon on the user interface.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer or computer or processor may be a processor for performing actions in accordance with instructions and one or more memory devices for storing instructions and data. Generally, a computer or computer or processor will also include, or be operatively coupled to receive data from or transfer data to, or both, one or more mass storage devices for storing data, e.g., magnetic, magneto optical disks, or optical disks. However, a computer or computing device need not have such devices. Moreover, a computer or computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the user interface described in this specification can be implemented on a computer having a non-flexible or flexible screen, e.g., a CRT (cathode ray tube), LCD (liquid crystal display) or OLED (organic light emitting diode) monitor, for displaying information to the user and a keyboard and a pointer, e.g., a finger, a stylus, a mouse or a trackball, by which the user can provide input to the computer. Other kinds of devices can be used to provide for interaction with a user as well; for example, feedback provided to the user can be any form of sensory feedback, e.g., touch feedback, visual feedback, auditory feedback, or tactile feedback; and input from the user can be received in any form, including acoustic, speech, touch or tactile input. In addition, a computer or computer or processor can interact with a user by sending documents to and receiving documents from a device that is used by the user; for example, by sending web pages to a web browser on a user's user device in response to requests received from the web browser.

Implementations of the subject-matter described in this specification can be implemented in a computing system that includes a back end component, e.g., as a server, or that includes a middleware component, e.g., an application server, or that includes a front end component, e.g., a user computer having a graphical user interface or a Web browser through which a user can interact with an implementation of the subject-matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any implementation or on the scope of what may be claimed, but rather as descriptions of features that may be specific to particular implementations of particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the operations recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, the method comprising:
    obtaining, at a database application, a selection of one or more database metadata items from a user device, wherein each database metadata item includes human-intelligible content that identifies an associated database object in a database;
    calculating a combined score for each of a plurality of predefined database views of the database application, the combined score of a respective predefined database view being calculated as a multiplication of: i) a matrix, each cell of the matrix indicating a number of a respective one of the database objects that are associated with the selected one or more database metadata items and that are included in the respective predefined database view, and ii) a vector of database object popularity statistics, each column of the vector indicating a number of previous user selections of a respective one of the database objects included in the respective predefined database view;
    identifying, from the plurality of predefined database views of the database application, one or more predefined database views having a highest combined score;
    registering the identified one or more predefined database views;
    monitoring, by a polling engine, to detect updates made to the one or more predefined database views after the registering; and
    triggering, by the polling engine, a push notification server to push an update notification to the user device in response to detecting at least one update made to the one or more predefined database views.

2. The computer-implemented method of claim 1, wherein triggering pushing of an update notification to the user device includes sending status update information to a push notification server, wherein the status update information includes information regarding an update of the predefined database view.

3. The computer-implemented method of claim 2, wherein the push notification server is a mobile device operating system push application server.

4. The computer-implemented method of claim 1, further comprising providing the identified one or more predefined database views for consumption to the user device.

5. The computer-implemented method of claim 1, wherein the one or more database objects include one or more columns of one or more database tables.

6. The computer-implemented method of claim 1, wherein one or more of the operations of obtaining the selection of one or more database metadata items, identifying one or more predefined database views, registering the identified one or more predefined database views, monitoring if the one or more predefined database views are updated, and triggering pushing of an update notification to the user device are performed by an in-memory database application.

7. The computer-implemented method of claim 1, wherein the user device is a mobile device.

8. The computer-implemented method of claim 1, wherein the one or more predefined database views include one or more of an attribute view, an analytic view, and a calculation view, wherein an attribute view references one or more data items in other tables of the database, wherein an analytic view defines one or more functions operable on data items in the database, and wherein a calculation view is operable to provide composites of other views.

9. The computer-implemented method of claim 1, wherein calculating the combined score includes multiplying a matrix that indicates the number of database objects associated with the selected one or more database metadata items, for the plurality of predefined database views, with a vector that indicates the number of previous user selections of the database objects, to calculate a combined score vector that indicates the combined score for each of the plurality of predefined database views.

10. The computer-implemented method of claim 1, wherein the database object popularity statistics are determined at least partially based on a selection frequency, in previous user selection processes, of database metadata items that are associated with the database objects.

11. The computer-implemented method of claim 1, wherein identifying one or more predefined database views of the database application comprises:
    obtaining user-specific information associated with the user of the user device; and
    identifying, based at least partially on the database objects associated with the selected one or more metadata items and the user information, the one or more predefined database views of the database application.

12. The computer-implemented method of claim 1, wherein identifying one or more predefined database views of the database application comprises:
    obtaining usage information of the database objects associated with the selected one or more metadata items; and
    identifying, based at least partially on the database objects associated with the selected one or more metadata items and the usage information of the database objects, the one or more predefined database views of the database application.

13. The computer-implemented method of claim 1, wherein monitoring if the one or more predefined database views are updated comprises one or more of monitoring a status of the predefined database views, monitoring if a measure or metadata calculated from a measure of the predefined database views changes and monitoring if an alert system of the predefined database view is triggered.

14. The computer-implemented method of claim 1, wherein the method further comprises providing a list of selectable database metadata items for presentation on the user device.

15. The computer-implemented method of claim 1, wherein the database metadata items include one or more of an identifier of the associated one or more database objects, a title of the associated one or more database objects, or a description of the associated one or more database objects.

16. The computer-implemented method of claim 1, the method further comprising receiving, from the user device, a request to provide the one or more updated predefined database views to the user device.

17. A non-transitory computer readable medium storing instructions thereon which when executed by a processor cause the processor to:
   obtain, at a database application, a selection of one or more database metadata items from a user device, wherein each database metadata item includes human-intelligible content that identifies an associated database object in a database;
   calculate a combined score for each of a plurality of predefined database views of the database application, the combined score of a respective predefined database view being calculated as a multiplication of: i) a matrix, each cell of the matrix indicating a number of a respective one of the database objects that are associated with the selected one or more database metadata items and that are included in the respective predefined database view, and ii) a vector of database object popularity statistics, each column of the vector indicating a number of previous user selections of a respective one of the database objects included in the respective predefined database view;
   identify, from the plurality of predefined database views of the database application, one or more predefined database views having a highest combined score;
   register the identified one or more predefined database views for future provision of data related to the one or more predefined database views to a user device;
   monitor, by a polling engine, to detect updates made to the one or more predefined database views after the registering; and
   trigger, by the polling engine, a push notification server to push an update notification to the user device in response to detecting at least one update made to the one or more predefined database views.

18. A system comprising:
   one or more processors; and
   a non-transitory computer-readable medium storing instructions executable by the one or more processors to perform operations comprising:
   obtaining, at a database application, a selection of one or more database metadata items from a user device, wherein each database metadata item includes human-intelligible content that identifies an associated database object in a database;
   calculating a combined score for each of a plurality of predefined database views of the database application, the combined score of a respective predefined database view being calculated as a multiplication of: i) a matrix, each cell of the matrix indicating a number of a respective one of the database objects that are associated with the selected one or more database metadata items and that are included in the respective predefined database view, and ii) a vector of database object popularity statistics, each column of the vector indicating a number of previous user selections of a respective one of the database objects included in the respective predefined database view;
   identifying, from the plurality of predefined database views of the database application, one or more predefined database views having a highest combined score;
   registering the identified one or more predefined database views;
   monitoring, by a polling engine, to detect updates made to the one or more predefined database views after the registering; and
   triggering, by the polling engine, a push notification server to push an update notification to the user device in response to detecting at least one update made to the one or more predefined database views.

* * * * *